Dec. 30, 1969 R. E. BRAUN ET AL 3,486,220

METHOD OF MANUFACTURING MAGNETIC TRANSDUCERS

Filed Nov. 28, 1967 2 Sheets-Sheet 1

INVENTORS
RICHARD E. BRAUN
HUI-LI TIAO
AMBROSE A. VERDIBELLO
BY Roger S. Smith
ATTORNEY

3,486,220
METHOD OF MANUFACTURING MAGNETIC TRANSDUCERS

Richard E. Braun and Hui-li Tiao, Boulder, Colo., and Ambrose A. Verdibello, Poughkeepsie, N.Y., assignors to International Business Machines Corporation, Armonk, N.Y., a corporation of New York Filed Nov. 28, 1967, Ser. No. 686,236
Int. Cl. G11b 5/42; H01f 7/06
U.S. Cl. 29—603 7 Claims

ABSTRACT OF THE DISCLOSURE

Method of producing transducers having controlled width working gaps by assembling transducer sections having reference surfaces at which pole faces that define the working gaps are exposed, plating the surfaces including the pole faces with a material having a greater resistance to grinding than the material of the pole faces and grinding the material until the pole faces are exposed. The grinding will affect the pole faces to a greater extent than the hard material and will leave their surfaces depressed below the reference surface. When the sections are assembled with the reference surfaces juxtaposed, the depressed pole faces have a gap between them.

Summary of invention

The present invention relates to the manufacture of magnetic transducers, and more particularly to an improved technique for achieving accurately dimensioned working gaps in such transducers.

Magnetic transducers are employed to transfer intelligence between magnetic storage media such as tapes, disks, drums or the like and related electronic data handling equipment. A transducer, in elemental form, includes at least one core or head of magnetic material forming a magnetic circuit that has a working gap therein, together with winding means for controlling or responding to magnetic flux in the magnetic circuit. As the flux in the head passes through the working gap, it establishes an external field in the area of the gap that can magnetize the record medium to write information, or respond to magnetization in the medium to read prerecorded intelligence.

The amount of intelligence that can be recorded on and read from a given area of the recording medium is a function of the width of the working gap in the head. To achieve the high recording densities demanded by modern data handling systems, it is necessary to provide heads with gaps in the order of 50 microinches in width. In transducers which employ multiple heads arranged to read and record information in plural tracks on the medium, it is also necessary that the several gaps be of uniform width. These demands present formidable problems in manufacture of transducers.

A widely used method of manufacturing magnetic transducer assemblies is described in U.S. Patent 3,064,333, issued Nov. 20, 1962 to Kristiansen et al. and assigned to the assignee hereof. Briefly described, that method comprises the assembly of transducer parts into separable sections each of which has a reference surface at which the pole faces that ultimately define the working gaps of the transducer are exposed. These surfaces are finished by lapping or grinding and then the sections are secured together with the reference surfaces in juxtaposition. Shims or spacers of non-magnetic material (such as Mylar polyester) are interposed between the reference surfaces to create the gaps between the pole faces.

This technique provides satisfactory results where gaps in the order of 100 microinches are acceptable, but difficulty is experienced in obtaining accurately dimensioned spaces for smaller gaps. In addition, fatigue, plastic flow, etc., in the spacer during the life of the transducer can alter the gap width.

It is the purpose of this invention to provide a novel technique for achieving gaps of desired accurate thicknesses as small as 20 or 25 microinches in magnetic transducers.

It is also an object of the invention to provide a technique for achieving such gaps with a construction which will effectively prevent alteration of gap width during the life of the transducer.

This invention makes beneficial use of the phenomenon that materials of different hardnesses will erode at different rates when ground or abraded under the same conditions. The manufacturing process provided by the invention contemplates the production of transducer sections having reference surfaces at which the pole faces are exposed in such a way that they protrude a short distance beyond the surface, and then applying to the reference surfaces, by electroplating or the like, a material having a hardness characteristic substantially greater than that of the pole face material. The hard material is applied to a thickness sufficient to cover the reference surface and the protruding pole faces. It is then lapped or ground down to a depth slightly more than that necessary to again expose the pole tips. Because of the different rates of erosion of the pole face material and the hard material under grinding influence, the pole faces will be eroded some distance below the surface of the hard material. This depression of the pole faces, the extent of which can be controlled in ways explained in detail later herein, forms the gap between pole faces when the ground or lapped surfaces of the transducer sections are assembled.

The foregoing and other objects, features and advantages of the invention will be apparent from the following more particular description of preferred embodiments of the invention as illustrated in the accompanying drawings.

Detailed description

Figure 1:
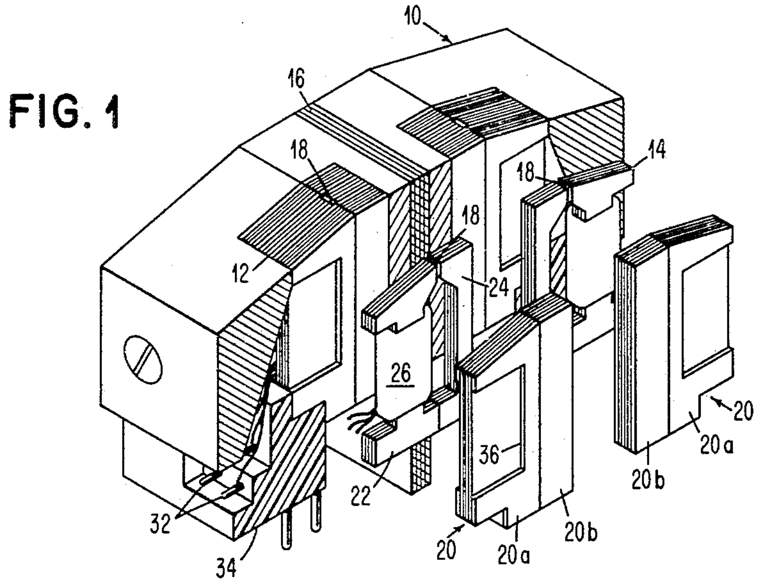
FIGURE 1 is a partial sectional and exploded view of a multi-track transducer to which the present invention is applicable.

Referring now in detail to the drawings, there is shown in FIGURE 1, a sectional and partially exploded view of a typical multitrack transducer. The device includes a housing unit 10 of brass or other nonmagnetic material that supports the operative parts of the assembly. The housing 10 carries a plurality of write heads 12 and the like number of read heads 14, each arranged in spaced apart, side-by-side relation. The write and read heads 12 and 14 are arranged on opposite sides of a center shield member 16, and they are aligned longitudinally of the head so that one write head and one read head follow the same channel or track on a magnetic record medium (not shown) passed longitudinally adjacent the operating surface of the head. Each write and read head has a working gap 18 exposed at the operating surface as shown.

The several write and read heads 12 and 14 are spaced from their neighbors by intertrack shield members 20 mounted in the housing unit 10. These shield members form the spaces between recording tracks and also serve to reduce "crosstalk" between adjacent heads.

To better illustrate the construction of the transducer assembly, one of the write heads 12 and an intertrack shield are shown exploded away from the assembly. As can be seen, the head comprises a plurality of laminations of magnetic material such as that iron-nickel alloy commercially available under the trade designation "Hi Mu 80" bonded together by a suitable cement such as an epoxy resin. The laminations are formed to provide two pole pieces 22 and 24 separated at one point to provide the working gap 18. The pole pieces 22 and 24 are also separated at their lower ends for ease of assembly so that a back gap also exists. This gap merely alters the reluctance of the head somewhat and does not form a working element. When the head 12 is mounted in housing 10, the ends of the coil are connected to terminal pins 32 in a connector block 34 attached to the housing.

The intertrack shield 20 which serves to space adjacent heads 12 apart is ordinarily also constructed of plural laminations, but at least some of these shield laminations, including the outermost ones, are formed of conductive material such as copper. The outermost laminations are also ordinarily notched as at 36 to provide space for the winding coils 26 of the adjacent heads. In conventional transducer design, some of the inner intertrack shield laminations are of magnetic material similar to that of the head laminations. The several intertrack shield laminations are also bonded together by epoxy in similar fashion to the head laminations. For purposes of construction which will presently be explained, the intertrack shields 20 are cut into two sections 20*a* and 20*b*, but these sections are juxtaposed in the final assembly as shown to form a unitary assembly.

It will be understood that the read heads 14 and the intertrack shields 20 between them are constructed in essentially the same manner as those just described.

Figure 2:
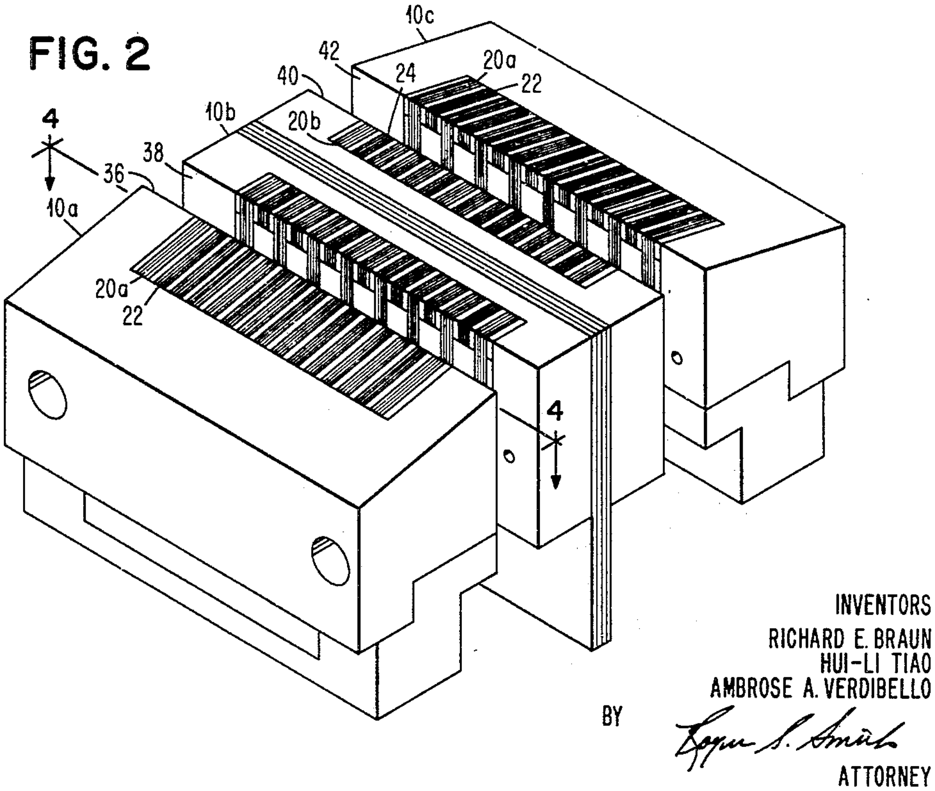
FIGURE 2 is a perspective view of the transducer shown in FIGURE 1, during the manufacturing process, showing three assemblages of which it is formed.

Referring now to FIGURE 2, there is shown a transducer at the point in its manufacture where it is necessary to finish the working gaps between the meeting faces of the pole pieces of the several heads 12 and 14. The procedures for obtaining the assemblages shown in FIGURE 2 are not critical to this invention and will not be described in detail. A satisfactory procedure for obtaining the assemblages is shown in U.S. Patent 3,064,333, mentioned above.

As will be seen in FIGURE 2, the transducer is divided in three separate assemblages at this point in its manufacture, the divisions between them being at planes in which the working gaps of the write and read heads reside. The leftmost assemblage includes a portion 10*a* of the housing in which are mounted the pole pieces 22 of the white heads 12 and the portions 20*a* of the intertrack shields 20 between the write heads. The faces 22*a* of the write head pole tips are exposed at the reference surface 36 of housing section 10*a*. The intermediate section of the assemblage includes a portion 10*b* of the housing that contains at one side the pole pieces 24 of the write heads and the portions 20*b* of the intertrack shields between the write heads, and at the other side the equivalent elements for the read heads 14 and their intertrack shields 20. The pole pieces and shield portions carried by section 10*b* are exposed at reference surfaces 38 and 40, respectively. The right hand section 10*c* of the housing 10 carries the pole pieces 22 of the read heads 14 and the portions 20*a* of the read head intertrack shields exposed at reference surface 42. This section is essentially a duplicate of section 10*a*, in organization of its parts.

The prior art method of obtaining gaps 18 between the pole pieces of the write and read heads of the transducer involved lapping or grinding the reference surfaces 36, 38, 40 and 42 to obtain the proper flatness and then inserting the non-magnetic shims between them and securing them together. In accordance with this invention, no shims are employed. Rather, a unique technique which depresses the pole faces a predetermined distance below the reference surfaces is used so that shimming it not required. This novel technique will not be described with reference to FIGURES 3 through 7 of the drawings. The technique will be described with reference to the head assemblage 10*a*, but as will become apparent, it is applicable to each of the assemblages 10*b* and 10*c*, as well.

Figure 3:
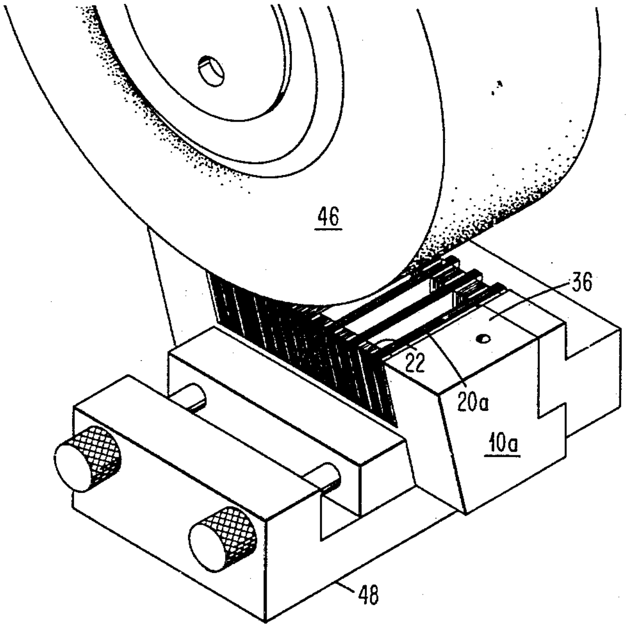
FIGURE 3 is a perspective view illustrating the method for grinding surfaces of one assemblage of FIGURE 2.
Figure 4:
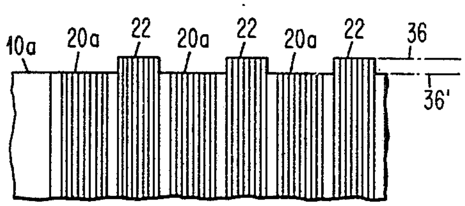
FIGURE 4 is a sectional view of a portion of the assemblage taken substantially along the line 4—4 of FIGURE 2, showing the pole faces projecting above the reference surface.
Figure 5:
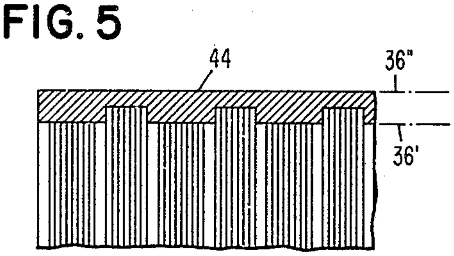
FIGURE 5 is a partial sectional view similar to FIGURE 4, but showing a hard material coated on the surface and the projecting pole faces.

After assemblage 10*a* has been completed and the various elements thereof secured firmly together to insure mechanical stability, the reference surface 36 is dressed, if necessary, by grinding or lapping as shown in FIGURE 3 to insure that the several pole faces 22*a* are flush with one another. The reference surface 36 is then subjected to a selective etching process to remove all of the materials forming the surface 36, except the pole pieces 22, to a predetermined depth. This leaves the pole pieces 22 projecting above the surrounding surface, which now is referred to by reference character 36', as shown in FIGURE 4. This selective etching may be accomplished mechanically by pantograph milling of those surfaces of housing 10*a* and the intertrack shield members 20*a* which form part of reference surface 36. It may also be accomplished by chemical etching with a solution such as an aqueous solution including 5% to 10% by volume of sulphuric acid and either 3% by volume of potassium dichromate or 10% by volume of ferric sulphate that will attack the brass and copper portions of surface 36, but not the magnetic material. In the latter case, any magnetic laminations in the intertrack shield members will not be etched, but will remain projecting above the etched surface 36'. As will become apparent later herein, failure to remove portions of these members is not critical.

The etching need not be carried on to any particular minimum depth, so long as the pole pieces are left projecting high enough to permit material to be deposited between them in sufficient depth to insure reasonable adhesion to the underlying elements during later processing steps.

After the etching operation has been completed, the surface 36' is coated with a hard non-magnetic material having a wear-resistance to grinding much greater than the magnetic material of the pole pieces. Chromium is such a material, as are non-magnetic nickel-tin alloys, for example. Other materials that might be employed will be suggested to those skilled in the art of metallurgy. The hard material, indicated at 44 in FIGURE 5, may be applied by any known coating process to which its metallurgical properties are amenable, including electroplating, electrolessplating, vacuum deposition, etc. In actual practice, chromium has been satisfactorily employed and it has been applied by conventional electroplating techniques. The material 44 is applied to surface 36' to a depth sufficient to cover the exposed pole faces 22.

The coated reference surface, which will now be referred to as 36'', is next subjected to careful abrading by grinding or lapping to remove the material 44 until the pole pieces 22 are again exposed. This operation is conducted in a manner that will also insure that the lapped surface, when finished, will have the flatness and alignment desired when the assemblages that make up the finished transducer are secured together. The arrangement shown in FIGURE 3 is satisfactory. This is a conventional apparatus including a cylindrical grinding wheel 46, together with a workpiece holder 48 mounted to translate the assemblage 10a past the face of the wheel in a plane tangent to the face of the wheel. Other suitable grinding or lapping devices are known. As stated above, the grinding or lapping process is carried on until the material covering the pole pieces is removed and they are exposed. At that point, further grinding is conducted to wear away both the material of the pole pieces and the material 44 between them. Due to the difference in grinding resistance between the material 44 and the magnetic material, the magnetic material will be removed at a greater rate and the surfaces of the pole pieces will become depressed below the surface of the material 44. The depth of depression is initially a function of the grinding time, but once a certain depth *d* has been achieved it remains effectively constant, irrespective of the grinding time. The certain constant depth *d* is primarily a function of the differences in grinding resistance of the two materials. That is to say, once a certain differential in surface levels has been reached by grinding the dissimilar materials, this differential remains the same. In the case where the material 44 is chromium and the magnetic material is Hi Mu 80, the differential has been found to become constant at about 20 to 30 microinches, where the grinding is performed with a 900 grit aluminum oxide grinding agent.

Figure 6:
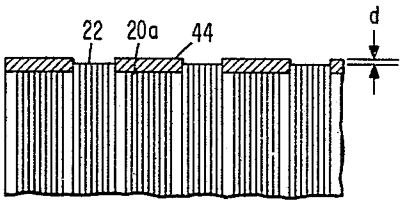
FIGURE 6 is a view similar to FIGURE 5, but showing the hard material ground away to re-expose and depress the pole faces.

It has also been found that the depressed surface of the magnetic material is left substantially flat, after grinding as shown in FIGURE 6, with no substantial concavity in the surface.

Figure 7:
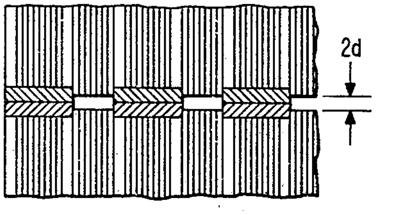
FIGURE 7 is a view similar to FIGURE 6, but showing two assemblages juxtaposed with the depressed pole faces thereof forming a controlled width working gap.

The pole face depression achieved as just described forms the working gap between the pole pieces 22 and 24 when the parts of the transducer are assembled with the reference surfaces 36, 38, 40 and 42 mated together. As shown in FIGURE 7, if both mating reference surfaces have been prepared by the technique described so that the faces of both pole pieces 22 and 24 have been depressed, the gap width is 2*d*. If only one surface has been treated, the width is *d*. It will be undrestood, then, that either width is readily obtained. By selection of materials for the coating 44 and by varying the grinding agent, some controlled variation of depth *d* can also be obtained. The selection of materials and agents for particular desired depths may be determined by experiment and is believed within the skill of the art.

Variation in the depression depth to achieve depressions less than the depth *d* may also be obtained by halting the grinding or lapping process before the minimum time necessary to reach the constant depth *d*, if desired. Uniformity from one unit to another is difficult to control in this case, however, and it is not recommended as a mass production technique.

The final assembly of the transducer sections 10a, 10b and 10c, after the working gaps have been obtained, is performed in the conventional manner and need not be explained herein. In this final assembly process it is desirable to fill the gaps with a non-magnetic substance to seal them against accumulations of extraneous material during use. Materials such as epoxy, glass or the like may be employed. A convenient method of filling voids in the assembly is by dipping the assembly into an epoxy bath and relying upon capillary action to draw the epoxy into the voids.

It will be noted that with the techniques described, the exposed back gap faces of the pole pieces 22 and 24 (and any similar material in the intertrack shield) will be depressed below the reference surfaces during the gap forming operation. This depression is not objectionable, since a small back gap in a head element does not materially alter its operation. Small gaps in the magnetic laminations of the intertrack shields have also been found quite acceptable. In particular embodiments where such gaps are not desired, the depressed faces of the magnetic material at the back gaps and in the intertrack shields may be filled with magnetic material in any suitable manner.

The invention described above provides working gaps of extremely fine proportions.

In addition to the excellent control of gap width achieved by this invention, transducers prepared as described enjoy the advantage that no shim or spacer must be pressed between the reference surfaces when they are mated, so the problem of spacer fatigue or plastic flow which might alter gap width is avoided.

While the invention has been particularly shown and described with reference to preferred embodiments thereof, it will be understood by those skilled in the art that various changes in form and details may be made therein without departing from the spirit and scope of the invention.

What is claimed is:

1. The method of forming a magnetic transducer section which includes a support member and at least one pole piece of magnetic material having a pole face, said support member having a reference surface, each said pole piece being mounted in the support member with its pole face adjacent the reference surface, said method including the steps of:

(a) forming said transducer section so that the pole face of each pole piece projects beyond the reference surface;

(b) coating the reference surface of said section with a material having a substantially greater abrasion resistance than the material of the pole pieces to a thickness sufficient to cover the projecting pole face of each pole piece; and (c) abrading the coated reference surface until each pole face in the section is re-exposed and for a predetermined time thereafter so that the magnetic material of each pole face is depressed below the coated reference surface.

2. The method defined in claim 1 wherein the predetermined time defined in step (c) is greater than the minimum time necessary to establish a constant depth of depression dependent upon the properties of the magnetic material of the pole faces and the coating material.

3. The method of forming working gaps in a magnetic transducer constructed to include a pair of assemblages each of which includes a support section and at least one pole piece of magnetic material having a pole face, each said support section having a reference surface adapted to be juxtaposed with the like reference surface of the other support section of the pair, each said pole piece being mounted in the support section with its pole face adjacent the reference surface so that when the support sections are arranged with their reference surfaces juxtaposed the pole pieces in the support sections mate to form at least one transducing head, said method including the steps of:

(a) forming at least one assemblage so that it has the pole face of each pole piece mounted therein projecting beyond the reference surface;

(b) coating the reference surface of said at least one assemblage with a material having a substantially greater abrasion resistance than the material of the pole pieces to a thickness sufficient to cover the projecting pole face of each pole piece included in that assemblage;

(c) abrading the coated reference surface until each pole face in the assemblage is re-exposed and for a predetermined time thereafter so that the magnetic material of each pole face is depressed below the coated reference surface; and (d) assembling the pair of assemblages with the reference surfaces juxtaposed to form a transducer having controlled width working gaps between the faces of the pole pieces.

4. The method defined in claim 3 wherein the steps (a), (b) and (c) are performed on each assemblage of the pair to form working gaps having a width equal to the sum of the depths of depression of the faces of the pole pieces in the two assemblages.

5. The method defined in claim 3 wherein the steps (a), (b) and (c) are performed on only one assemblage of the pair and the faces of the pole pieces in the other assemblage are positioned in the plane of the reference surface of that assemblage to form working gaps having a width equal to the depth of depression created in step (c).

6. The method defined in claim 3 wherein the predetermined time defined in step (c) is greater than the minimum time necessary to establish a constant depth of depression dependent upon the properties of the magnetic material of the pole faces and the coating material.

7. The method of claim 3 wherein the step (a) includes removing a layer of material from the reference surface of the said at least one assemblage to cause the faces of the pole pieces to project beyond the reference surface.

References Cited

UNITED STATES PATENTS

| | | | |
|---|---|---|---|
| 3,129,504 | 4/1964 | Ivan et al. | 29—529 |
| 3,384,954 | 5/1968 | Bradford et al. | 29—603 |

JOHN F. CAMPBELL, Primary Examiner

C. E. HALL, Assistant Examiner

U.S. Cl. X.R.

179—100.2; 51—281; 29—529